(12) United States Patent
Kakomura et al.

(10) Patent No.: US 12,411,445 B2
(45) Date of Patent: Sep. 9, 2025

(54) IMAGE FORMING APPARATUS

(71) Applicant: CANON KABUSHIKI KAISHA, Tokyo (JP)

(72) Inventors: Kiyoharu Kakomura, Chiba (JP); Takuya Machida, Chiba (JP); Masashi Yokoyama, Saitama (JP); Itsuki Nishida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/423,464

(22) Filed: Jan. 26, 2024

(65) Prior Publication Data

US 2024/0160139 A1    May 16, 2024

Related U.S. Application Data

(63) Continuation of application No. 18/098,225, filed on Jan. 18, 2023, now Pat. No. 11,921,452.

(30) Foreign Application Priority Data

Jan. 24, 2022    (JP) ................................. 2022-008457

(51) Int. Cl.
G03G 15/00    (2006.01)

(52) U.S. Cl.
CPC ..... *G03G 15/5008* (2013.01); *G03G 15/5016* (2013.01); *G03G 15/5029* (2013.01); *G03G 15/6591* (2013.01); *G03G 2215/00371* (2013.01); *G03G 2215/00742* (2013.01); *G03G 2215/00949* (2013.01)

(58) Field of Classification Search
CPC .......... G03G 15/5008; G03G 15/5016; G03G 15/5029; G03G 15/6591
USPC ........................................ 399/75, 81, 82, 85
See application file for complete search history.

(56) References Cited

U.S. PATENT DOCUMENTS 7,965,955 B2    6/2011    Takahashi et al.
11,921,452 B2 *  3/2024    Kakomura ......... G03G 15/5029

FOREIGN PATENT DOCUMENTS

| CA | 2521415 C   |   | 1/2010 |
| CN | 100378598   | * | 4/2008 |
| JP | 2006-251719 | * | 9/2006 |

* cited by examiner

*Primary Examiner* — Hoan H Tran
(74) *Attorney, Agent, or Firm* — VENABLE LLP

(57) ABSTRACT

An image forming apparatus includes an image forming unit to form an image on a sheet based on a mode selected from a plurality of modes having different image forming speeds, a memory to store first data for a first mode included in the plurality of modes, the first data indicating a correspondence for the first mode between a type of the sheet and the image forming speed, and second data for a second mode included in the plurality of modes, the second data indicating a correspondence for the second mode between a type of the sheet and the image forming speed, and a display. A controller determines a first image forming speed for the first mode from the first data based on the type of the sheet, and determines a second image forming speed for the second mode from the second data.

16 Claims, 14 Drawing Sheets

| FIRST SPEED | 400[mm/s] |
|---|---|
| SECOND SPEED | 300[mm/s] |
| THIRD SPEED | 200[mm/s] |

| | SHEET CATEGORY | | |
|---|---|---|---|
| | PLAIN PAPER (64-150gsm) | THICK PAPER 1 (151-250gsm) | THICK PAPER 2 (251-350gsm) |
| PRODUCTIVITY PRIORITY MODE | 400[mm/s] | 400[mm/s] | 300[mm/s] |
| IMAGE-QUALITY PRIORITY MODE | 300[mm/s] | 200[mm/s] | 200[mm/s] |

SELECTION OF SHEET

- PLAIN PAPER 1
- THICK PAPER 1
- THICK PAPER 2
- THICK PAPER 1_REVISED

CANCEL　OK　COPY

FIG. 9

CHANGE OF SHEET SETTING

- BASIS WEIGHT
- TRANSFER VOLTAGE
- FIXING TEMPERATURE
- IMAGE FORMING SPEED IN IMAGE-QUALITY PRIORITY MODE

CANCEL　OK

FIG. 10

| PLAIN PAPER (64-150gsm) | | THICK PAPER 1 (151-250gsm) | | THICK PAPER 2 (251-350gsm) | |
|---|---|---|---|---|---|
| UPPER LIMIT SPEED 1 | 400[mm/s] | UPPER LIMIT SPEED 2 | 400[mm/s] | UPPER LIMIT SPEED 3 | 300[mm/s] |
| LOWER LIMIT SPEED 1 | 200[mm/s] | LOWER LIMIT SPEED 2 | 200[mm/s] | LOWER LIMIT SPEED 3 | 200[mm/s] |

IMAGE FORMING APPARATUS

This application is a continuation of application Ser. No. 18/098,225, filed Jan. 18, 2023.

BACKGROUND OF THE INVENTION

Field of the Invention

The present disclosure relates to an image forming apparatus for forming an image on paper, such as a copying machine, a printer, and a facsimile machine.

Description of the Related Art

An image forming apparatus is required to have multimedia compatibility that allows the apparatus to print an image on various types of sheets including thin paper, thick paper, and coated paper (gross coated paper, matte coated paper, and the like), and at high productivity. As the basis weight of the sheet increases, it is required to increase an amount of heat applied to the sheet during fixing of an image transferred onto the paper. In general, in order to increase an amount of heat applied per unit area of paper, an image forming speed is set to be lower as the basis weight of the sheet becomes heavier. For this reason, the image forming apparatus is capable of operating at a plurality of image forming speeds in accordance with the basis weight and the surface property of each paper. An image forming speed means an operation speed of an image forming unit, such as a photosensitive drum, a developing device, and an intermediate transfer belt, which are described later, a conveying speed of sheet during transfer of an image onto the paper, a conveying speed of paper during fixing of a toner on the paper, or the like.

A point on which a user puts importance may differ depending on a printed product being output. For example, for text printing of a document or the like, many users put importance on maximization of productivity rather than image quality. For image printing of photographs or the like, many users put importance on maximization of image quality rather than productivity. An image forming apparatus of U.S. Pat. No. 7,965,955 B2 has selectable modes of a productivity priority mode in which an image forming speed is high while an image quality is kept within a predetermined range, and an image-quality priority mode in which an image forming speed is set so as to maximize an image quality. An image is printed at an image forming speed corresponding to an operation mode selected by a user.

Image forming apparatus of recent years handle many types of paper. Thus, pieces of paper having the same basis weight are significantly different in property in some cases. For example, stiffness is given as a paper property. Stiffness, which is also called flexural rigidity of paper, is an index indicating resistance of paper to bending when the paper is bent. In a case in which the stiffness is high, when paper enters into a transfer unit (transfer nip) that transfers an image onto the paper, a significant impact is exerted on the transfer unit by the paper. This becomes a cause of unevenness in an image being transferred onto the paper. In such a case, to reduce a speed (image forming speed) at which the paper enters into the transfer unit lessens the impact, thereby being capable of reducing a cause of image unevenness.

The image-quality priority mode is a mode in which an image at a maximized image-quality level is formed on each of pieces of paper having the same basis weight irrespective of the property thereof. To this end, it is considered to set an image forming speed in accordance with an image forming speed for paper having the highest stiffness, for example. The image forming speed for paper having the highest stiffness is lower than an image forming speed for other paper. This means that a low image forming speed corresponding to paper having the highest stiffness among pieces of paper having the same basis weight is set though a higher image forming speed can be set for other paper having lower stiffness. Thus, in the image-quality priority mode, an image is formed at a low image forming speed irrespective of paper property, and hence it is difficult to increase productivity. Therefore, it is required to improve productivity while maintaining an image quality in forming an image with priority given to an image quality.

SUMMARY OF THE INVENTION

An image forming apparatus according to the present disclosure includes: an image forming unit configured to form an image on a sheet based on a mode selected from a plurality of modes having different image forming speeds; a memory configured to store first data for a first mode included in the plurality of modes, the first data indicating a correspondence for the first mode between a type of the sheet and the image forming speed, and second data for a second mode included in the plurality of modes, the second data indicating a correspondence for the second mode between a type of the sheet and the image forming speed; a display; and a controller configured to: determine a first image forming speed for the first mode from the first data based on the type of the sheet; determine a second image forming speed for the second mode from the second data based on the type of the sheet; display, on the display, a screen for receiving user instruction information regarding a change in the second image forming speed corresponding to a first type of sheet for the second mode; and change the second image forming speed corresponding to the first type of sheet based on the user instruction information.

Further features of the present invention will become apparent from the following description of exemplary embodiments (with reference to the attached drawings).

BRIEF DESCRIPTION OF THE DRAWINGS

FIG. 9 is a view for illustrating an example of a sheet-type selection screen in a case in which a new type of sheet is added.

FIG. 10 is a view for illustrating an example of a sheet-setting change screen.

DESCRIPTION OF THE EMBODIMENTS

Exemplary embodiments of the present disclosure are illustratively described in detail below with reference to the drawings.

First Embodiment

Figure 1:
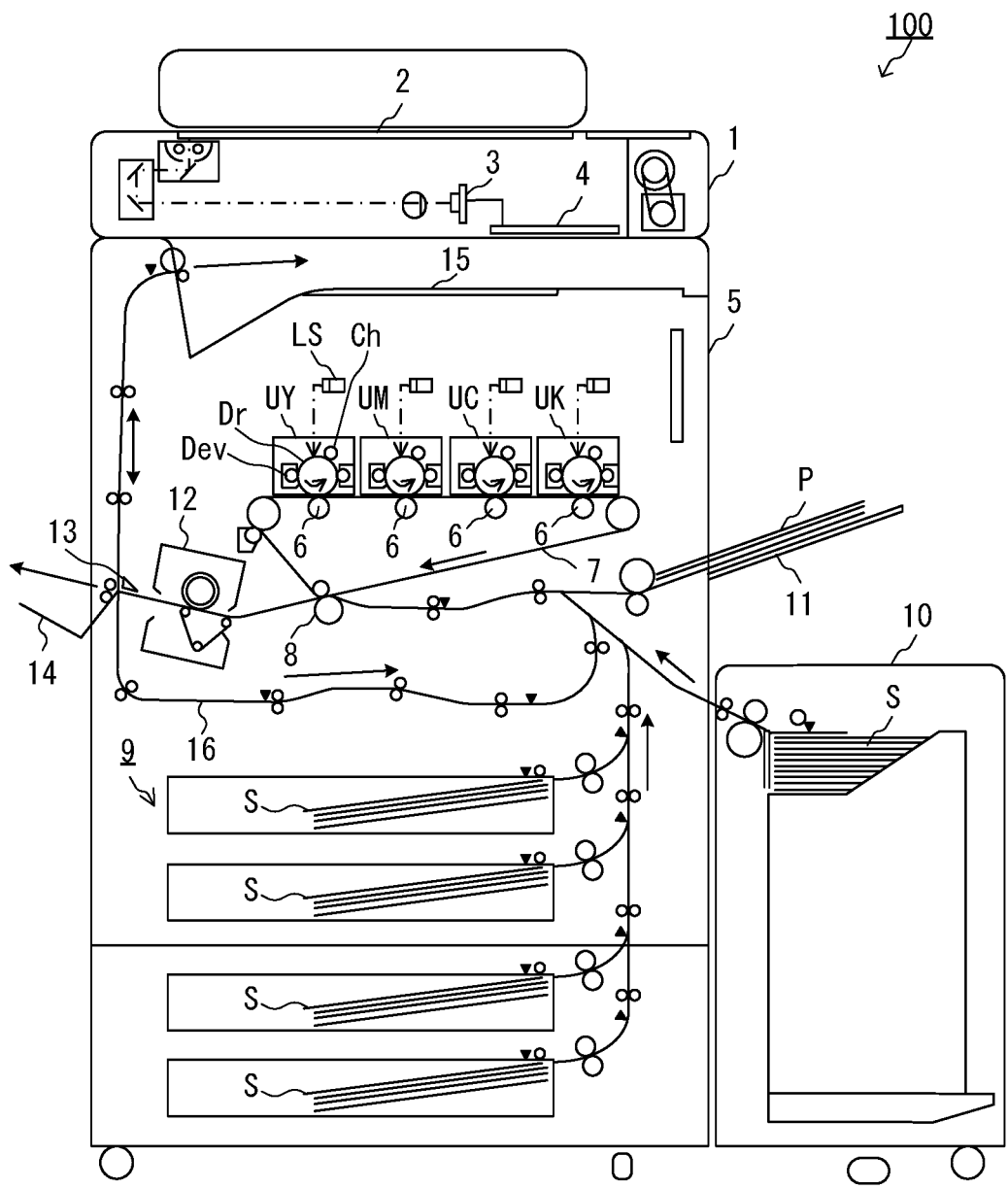
FIG. 1 is a configuration view of an image forming apparatus.

FIG. 1 is a configuration diagram of an image forming apparatus 100 according to a first embodiment of the present disclosure. The image forming apparatus 100 is an electrophotographic full-color image forming apparatus. The image forming apparatus 100 includes a reader 1 and a printer 5. The reader 1 is provided on a casing of the printer 5. The reader 1 in the first embodiment is an image reading apparatus that reads a color image from an original. The printer 5 in the first embodiment is a color printer that prints a color image on a sheet S such as paper. The image forming apparatus 100 described above is a copying machine, a multi-function machine, or the like, for example.

The reader 1 includes a platen 2, a full-color sensor 3, and an image processor 4. An original on which an image to be read is printed is placed on the platen 2. The full-color sensor 3 is an optical sensor such as a charge coupled device (CCD) image sensor, for example. The full-color sensor 3 receives reflected light of light emitted to an original, and converts the received reflected light into an electric signal (color separation image signal). The color separation image signal is subjected to image processing by the image processor 4 and is transmitted to the printer 5.

The printer 5 has a configuration in which four image forming units (first to fourth image forming units UY, UM, UC, and UK) are arranged in tandem. Each of the first to fourth image forming units UY, UM, UC, and UK is an electrophotographic processing mechanism using laser exposure, and forms an image based on a color separation image signal acquired from the reader 1 during copying processing, for example. The printer 5 includes a primary transfer unit 6, an intermediate transfer belt 7, a secondary transfer unit 8, a fixing device 12, a cassette sheet feed mechanism 9, and a manual sheet feeder 11. The printer 5 is connected to a deck sheet feeder 10.

Each of the first to fourth image forming units UY, UM, UC, and UK includes a photosensitive drum Dr, a charging device Ch, an exposing device LS, a developing device Dev, and the like. In FIG. 1, each unit in only the first image forming unit UY is denoted by a reference symbol, and a reference symbol of each unit in the second to fourth image forming units UM, UC, and UK is omitted. The photosensitive drum Dr is a drum-shaped photosensitive member including a photosensitive layer in a surface thereof. The charging device Ch uniformly charges the surface of the photosensitive drum Dr. The exposing device LS includes a light source. The light source of the exposing device LS emits laser light that is modulated in accordance with a color separation image signal of its corresponding color to the charged surface of the photosensitive drum Dr, to thereby form an electrostatic latent image on the surface of the photosensitive drum Dr. The developing device Dev develops the electrostatic latent image with a toner of its corresponding color, to thereby form a toner image on the photosensitive drum Dr.

The first image forming unit UY forms a yellow toner image on the surface of the photosensitive drum Dr. The second image forming unit UM forms a magenta toner image on the surface of the photosensitive drum. The third image forming unit UC forms a cyan toner image on the surface of the photosensitive drum. The fourth image forming unit UK forms a black toner image on the surface of the photosensitive drum. The first to fourth image forming units UY, UM, UC, and UK form toner images with respective timings thereof.

The toner images formed on the respective photosensitive drums of the first to fourth image forming units UY, UM, UC, and UK are sequentially superimposed and transferred onto the intermediate transfer belt 7 by the primary transfer unit 6. As a result, a full-color toner image in which the toner images of the four colors overlap each other is formed on the intermediate transfer belt 7. The intermediate transfer belt 7 rotates, to thereby convey the full-color toner image to the secondary transfer unit 8.

The sheet S can be fed from the cassette sheet feed mechanism 9, the manual sheet feeder 11, and the deck sheet feeder 10. The sheet S is fed from any of the cassette sheet feed mechanism 9, the manual sheet feeder 11, and the deck sheet feeder 10 to the secondary transfer unit 8, in accordance with timings of image formation by the first to fourth image forming units UY, UM, UC, and UK. The secondary transfer unit 8 includes a transfer nip formed between the secondary transfer unit 8 and the intermediate transfer belt 7. The secondary transfer unit 8 transfers, at the transfer nip, full-color toner images (unfixed images) borne by the intermediate transfer belt 7 at once onto the sheet S being fed. The sheet S onto which the toner images (unfixed images) have been transferred is conveyed from the secondary transfer unit 8 to the fixing device 12.

The fixing device 12 fixes the unfixed toner images on the sheet S while conveying the sheet S. In this case, the fixing device 12 conveys the sheet S onto which the toner images have been transferred while grasping the sheet S with a fixing nip portion. During the process of grasping and conveying, the unfixed toner images are subjected to melting and color mixture due to heat and a pressure to be fixed as an adhered image on the sheet S. The sheet S on which the images have been fixed is discharged to a face-up sheet discharge tray 14 or a face-down sheet discharge tray 15, as a printed product. A flapper 13 is placed in the rear of the fixing device 12. The sheet S is discharged to any one of the face-up sheet discharge tray 14 or the face-down sheet discharge tray 15 by the flapper 13.

For double-sided printing, the sheet S in which an image has been formed on one surface (first surface) is first conveyed from the fixing device 12 to a conveying path closer to the face-down sheet discharge tray 15, and thereafter is conveyed in a switchback manner to a re-conveying sheet path 16. As a result, in the sheet S, a printed surface is reversed. The sheet S is conveyed to the secondary transfer unit 8 via the re-conveying sheet path 16. Then, toner images are transferred onto a second surface different from the first surface of the sheet S, and an image is fixed by the fixing device 12 in the same manner as an image is printed on the first surface. In this manner, an image is printed on the second surface. The sheet S in which images have been printed on both surfaces is discharged to the face-up sheet discharge tray 14 or the face-down sheet discharge tray 15.

Figure 2:
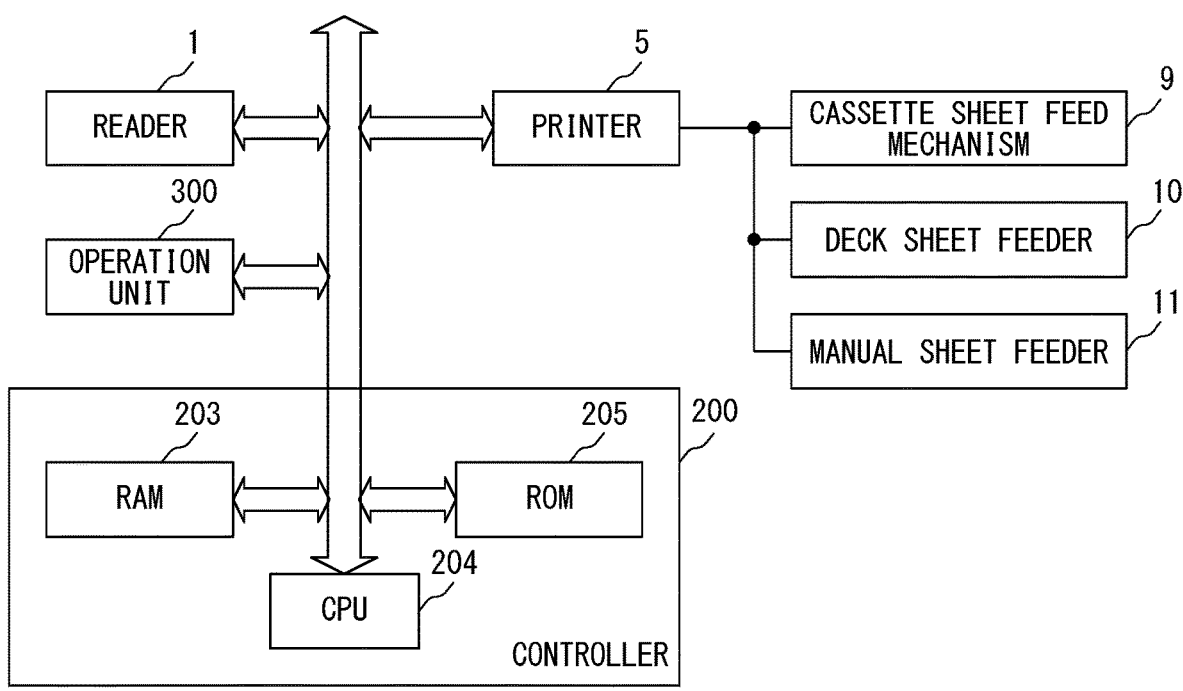
FIG. 2 is an explanatory diagram of a controller.

FIG. 2 is an explanatory diagram of a controller that controls operations of the image forming apparatus 100. The controller 200 is an information processing apparatus including a central processing unit (CPU) 204, a read only memory (ROM) 205, and a random access memory (RAM) 203. The CPU 204 controls overall operations of the image forming apparatus 100 by executing a computer program stored in the ROM 205. The RAM 203 is a memory that provides a working area used by the CPU 204 in performing processing. The controller 200 is connected to the reader 1 and the printer 5 described above, and in addition, to an operation unit 300. The controller 200 is provided in the casing of the printer 5, for example.

The reader 1 transmits a color separation image signal to the controller 200. The controller 200 controls the operation of the printer 5 as described above in accordance with the color separation image signal, and prints an image on the sheet S. The printer 5 causes the first to fourth image forming units UY, UM, UC, and UK, the secondary transfer unit 8, the fixing device 12, and the like to operate in accordance with an instruction from the controller 200, to thereby perform the above-mentioned image forming processing (printing processing). As described above, the printer 5 includes the cassette sheet feed mechanism 9, the deck sheet feeder 10, and the manual sheet feeder 11. The printer 5 feeds the sheet S used for printing from any of the cassette sheet feed mechanism 9, the deck sheet feeder 10, and the manual sheet feeder 11 in accordance with an instruction from the controller 200. The printer 5 controls the conveying speed of the sheet S during feeding in accordance with an instruction from the controller 200.

Figure 3A:
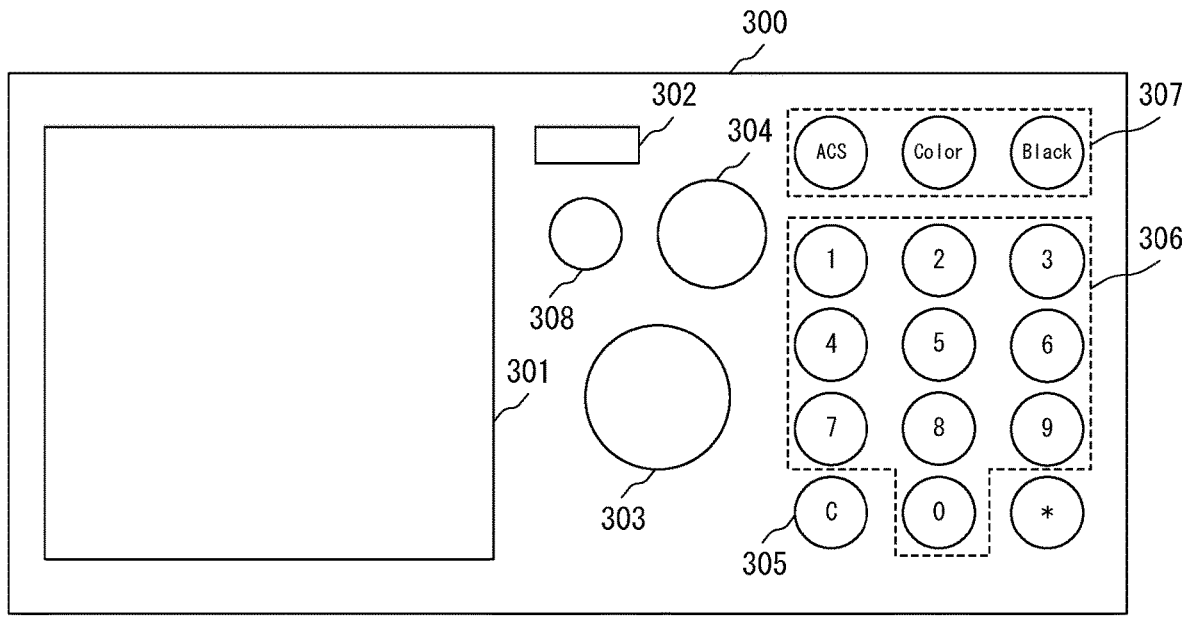
FIG. 3A and FIG. 3B are explanatory views of an operation unit.
Figure 3B:
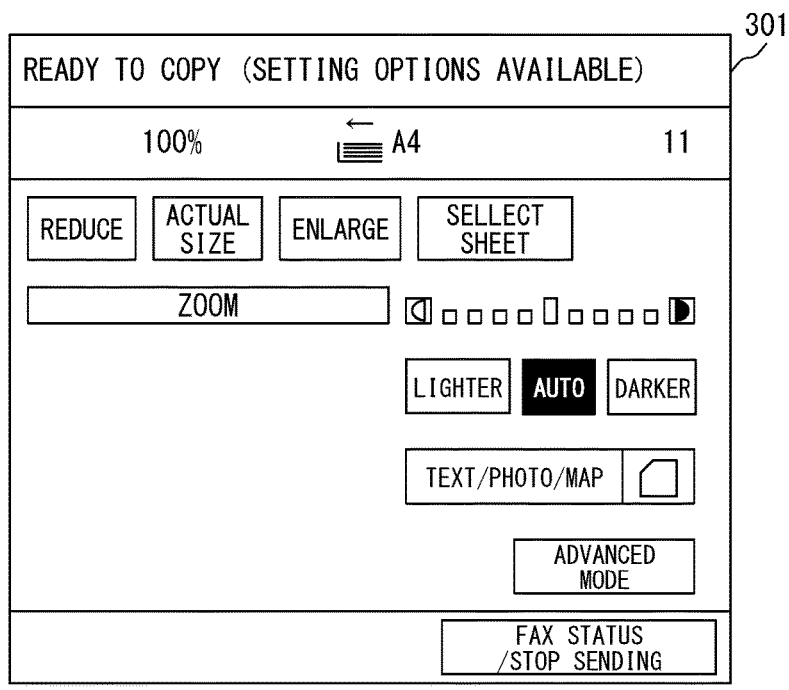

FIG. 3A and FIG. 3B are explanatory views of the operation unit 300. A user can input various kinds of conditions and information regarding image formation into the image forming apparatus 100 to perform setting by using the operation unit 300. The operation unit 300 is a user interface including an input interface and an output interface. The input interface includes various key buttons, a touch panel, and the like. The output interface includes a display 301, a speaker, and the like. The operation unit 300 is used for displaying printing information, information about progress of printing, or the like, and for performing various kinds of settings of the printer 5.

FIG. 3A is a plan view of the operation unit 300. The operation unit 300 includes the display 301, a reset key 302, a start key 303, a stop key 304, a clear key 305, a numeric keypad 306, color-mode selection keys 307, and a user mode key 308. FIG. 3B shows an example of a setting screen displayed on the display 301 during copying. In the setting screen during copying, the number of copies, a selected sheet size, a magnification, a copy density, and the like can be set.

The reset key 302 is used for resetting the settings, and is operated in returning to a standard mode from a copy mode, for example. The start key 303 is used for giving an instruction to start a copying operation, for example. The stop key 304 is used for giving an instruction to stop a copying operation, for example. The clear key 305 is used in returning an operation mode from a copy mode to a standard mode, for example. The numeric keypad 306 is used for setting a numeric value for setting the number of copies or the like, for example. The user mode key 308 displays a selection screen described later on the display 301, when pressed down.

The color-mode selection keys 307 include an "ACS" key, a "Color" key, and a "Black" key. The "ACS" key is used for causing the reader 1 to automatically determine whether an image of an original being read is a color image or a monochrome image. For a color image, the "ACS" key is used for causing the reader 1 to output a color image signal, and for a monochrome image signal, the "ACS" key is used for causing the reader 1 to output a monochrome image signal. The "Color" key is used for causing the reader 1 to output a color image signal irrespective of an image of an original. The "Black" key is used for causing the reader 1 to output a monochrome image signal irrespective of an image of an original. In the first embodiment, the color-mode selection keys 307 are configured such that a selected one of the keys lights up.

<Image-Quality Priority Mode and Productivity Priority Mode>

When a toner image transferred onto the sheet S is fixed by the fixing device 12, an optimal image forming speed is set in accordance with the basis weight of the sheet S because an amount of heat applied to the sheet S per unit time varies with the basis weight of the sheet S. To set a basis weight for each sheet S requires a user to perform a complicated operation. Thus, in the image forming apparatus 100, the same transfer condition, the same fixing condition, and the same sheet conveying speed (image forming speed) are set for each of predetermined basis-weight ranges. The above-mentioned basis-weight range is referred to as "sheet category." In the following example, a sheet category of the sheet S having a basis weight of from 64 gsm to 150 gsm is referred to as "plain paper," a sheet category of the sheet S having a basis weight of from 151 gsm to 250 gsm is referred to as "thick paper 1," and a sheet category of the sheet S having a basis weight of from 251 gsm to 350 gsm is referred to as "thick paper 2."

Figures 4, 5, 6:
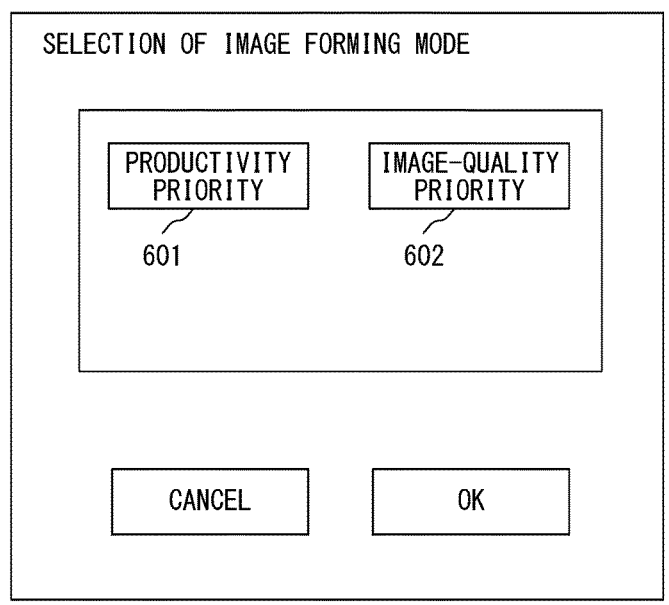
FIG. 4 is an explanatory diagram of an image forming speed.
FIG. 5 is an explanatory diagram of an image forming speed for each sheet category.
FIG. 6 is a view for illustrating an example of an operation-mode selection screen.

FIG. 4 is an explanatory diagram of an image forming speed of the image forming apparatus 100. When an image forming speed is changed, the rotation speed of the photosensitive drum Dr and the rotation speed of the intermediate transfer belt 7 are controlled such that the respective rotation speeds are set to rotation speeds based on the image forming speed. The image forming apparatus 100 of the first embodiment can operate at first to third speeds as the image forming speed. In the first embodiment, the first speed is the highest image forming speed and is 400 mm/s. The second speed is an image forming speed lower than the first speed and is 300 mm/s. The third speed is the lowest image forming speed and is 200 mm/s.

In a productivity priority mode in which priority is given to productivity of a printed product, an image forming speed is set to the highest speed at which an image can be formed. In an image-quality priority mode in which priority is given to an image quality of a printed product, an image forming speed is set to be lower than that in the productivity priority mode. In the image-quality priority mode, an image of a printed product is printed with a higher image quality than that in the productivity priority mode. In other words, in the productivity priority mode, the image forming apparatus 100 has higher production capability than that in the image-quality priority mode. Each of the productivity priority mode and the image-quality priority mode is described.

The productivity priority mode is an operation mode in which an image is formed at the maximum image forming speed at which an image can be formed. In the productivity priority mode, an image quality is kept within a predetermined range, and productivity is maximized. The image-quality priority mode is an operation mode in which an image is formed at an image forming speed lower than that in the productivity priority mode in order to maximize the image quality of an image printed on a printed product. For example, in the image-quality priority mode, a conveying speed of the sheet S at the time of entry of the sheet S into the secondary transfer unit 8 (i.e., a conveying speed at which the sheet S passes the transfer nip) is reduced to reduce a shock given at the time of entry of the sheet S into the secondary transfer unit 8, to thereby improve a transfer image quality. Further, in the image-quality priority mode, a conveying speed of the sheet S in the fixing device 12 (i.e., a conveying speed at which the sheet S is conveyed by the fixing device 12) is reduced to allow the fixing device 12 to apply a larger amount of heat to the sheet S, to thereby make the sheet glossier.

FIG. 5 is an explanatory diagram of an image forming speed for each sheet category in each of the operation modes (the productivity priority mode and the image-quality priority mode). In FIG. 5, the sheet categories are plain paper, thick paper 1, and thick paper 2. An image forming speed is determined based on the operation mode and the sheet category. For example, an image forming speed for the plain paper is equal to a first speed (400 mm/s) in the productivity priority mode, and is equal to a second speed (300 mm/s) in the image-quality priority mode. The thick paper 1 and the thick paper 2 have each a heavier basis weight, and hence a shock given to the secondary transfer unit 8 at the time of entry of the sheet thereinto is required to be more significantly reduced. Thus, an image forming speed for the thick paper 1 and the thick paper 2 in the image-quality priority mode is equal to a third speed (200 mm/s), which is the lowest speed. An image forming speed for the thick paper 1 in the productivity priority mode is equal to the first speed (400 mm/s). An image forming speed for the thick paper 2 in the productivity priority mode is equal to the second speed (300 mm/s) because the sheet S is required to be applied with a larger amount of heat by the fixing device 12 than the thick paper 1.

The first embodiment discusses plain paper/thick paper having a surface property of woodfree paper, but an image forming speed can be determined in the same manner as described above based on information about a surface property (surface treatment), that is, information about whether sheet has a surface coated by a coating agent, such as coated paper. Further, it has been described that the image forming speed for the plain paper is equal to the second speed in the image-quality priority mode, but the image forming speed is not always required to be equal to the second speed as long as the image forming speed is lower than the first speed. For example, the image forming speed may be equal to the third speed or a fourth speed different from the second and third speeds. In other words, the image forming speed may be settable to more speeds than the first, second, and third speeds. It has been described that the image forming speed in the image-quality priority mode is lower than the image forming speed in the productivity priority mode, but the respective image forming speeds may be the same depending on the basis weight of sheet. For example, both of the image forming speeds for the plain paper in the image-quality priority mode and in the productivity priority mode may be equal to the same first speed.

The information (table) about the image forming speed for each sheet category in each of the operation modes shown in FIG. 5 is stored in the RAM 203 or the ROM 205 in advance. The CPU 204 determines an image forming speed in image formation based on this information, and prints an image on the sheet S.

<Selection of Operation Mode>

FIG. 6 is a view for illustrating an example of an operation-mode selection screen. The selection screen is displayed on the display 301 of the operation unit 300. A user can select an operation mode (the productivity priority mode or the image-quality priority mode) in the selection screen by using the input interface of the operation unit 300. Information indicating a result of selection of an operation mode is stored in the RAM 203.

The selection screen of FIG. 6 is displayed on the display 301 when the user mode key 308 is pressed down. The user selects any one of a selection button 601 for the productivity priority mode or a selection button 602 for the image-quality priority mode in the selection screen by using the operation unit 300 before printing is performed. The controller 200 acquires the selection from the operation unit 300 and sets the image forming apparatus 100 to the selected operation mode. The information about the set operation mode is stored in the RAM 203.

When the selection button 601 for the productivity priority mode is selected, the image forming apparatus 100 can form an image on all sheets stored in all of the sheet feed stages (the cassette sheet feed mechanism 9, the manual sheet feeder 11, and the deck sheet feeder 10) with maximized productivity. When the selection button 602 for the image-quality priority mode is selected, the image forming apparatus 100 can form an image on all sheets stored in all of the sheet feed stages with maximized image quality.

<Registration of Sheet in Each Sheet Feed Stage>

Figure 7:
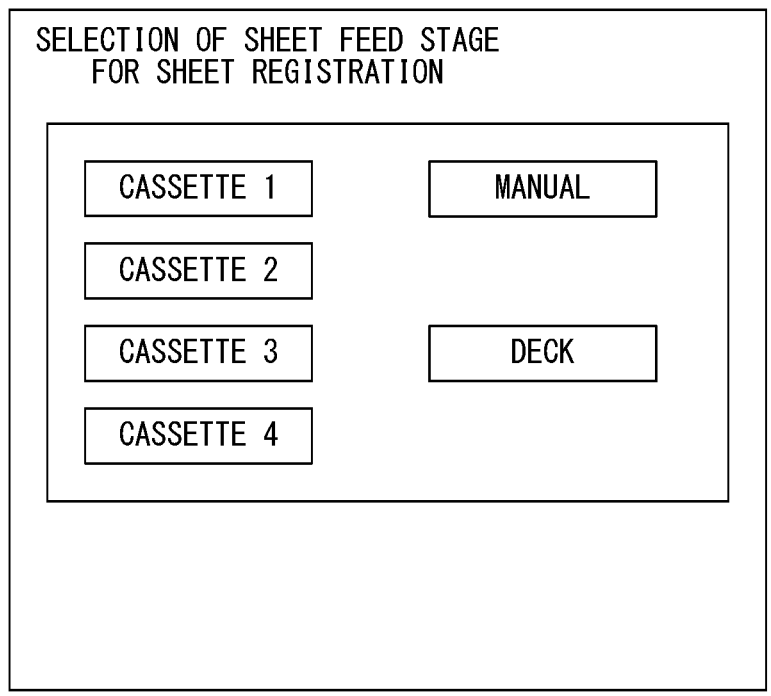
FIG. 7 is a view for illustrating an example of a sheet registration screen.

With regard to the sheet S stored in each of the sheet feed stages of the cassette sheet feed mechanism 9, the manual sheet feeder 11, and the deck sheet feeder 10, the type and the category of the sheet are registered in the image forming apparatus 100. FIG. 7 is a view for illustrating an example of a sheet registration screen. A user selects a sheet feed stage for which sheet is to be registered in the registration screen of FIG. 7 displayed on the display 301 by using the operation unit 300. The cassette sheet feed mechanism 9 includes cassettes 1 to 4. A sheet feed stage is selected so that the type of sheet stored in the selected sheet feed stage can be selected.

Figure 8:
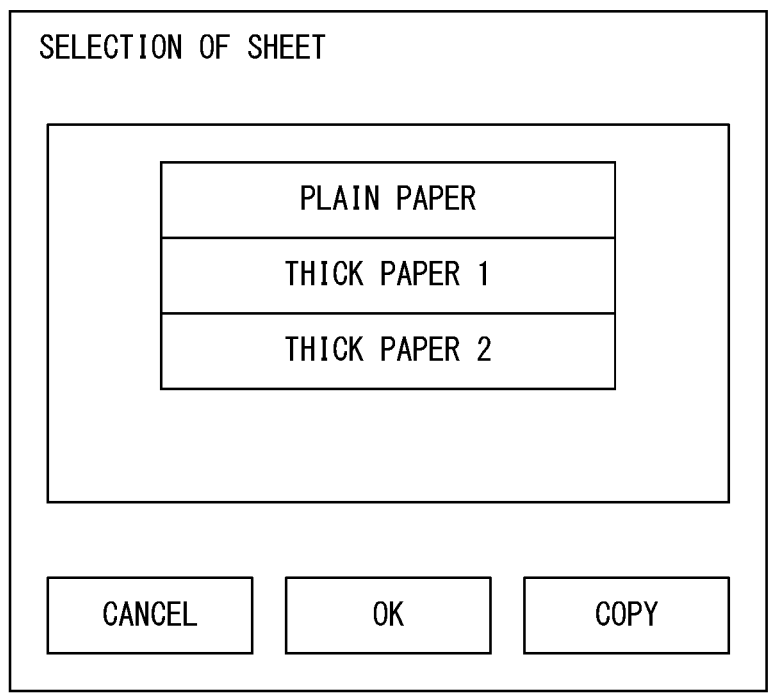
FIG. 8 is a view for illustrating an example of a sheet-type selection screen.

FIG. 8 is a view for illustrating an example of a sheet-type selection screen that is displayed when a sheet feed stage is selected. The controller 200 stores a list of types of sheets that can be used in the image forming apparatus 100 in the RAM 203. The list of types of sheets is stored for each of the predetermined sheet categories in the image forming apparatus 100. The user selects a type of sheet S stored in the cassette sheet feed mechanism 9, the deck sheet feeder 10, and the manual sheet feeder 11 from the list, and presses down an OK button. Then, registration of the sheet of the sheet feed stage selected in FIG. 7 is completed. The registered information is stored in the RAM 203.

In a case in which a typical type of sheet is used, the sheet is registered in the above-mentioned manner. However, because of a wide variety of is sheets are handled in the image forming apparatus 100, in some cases, the image forming apparatus 100 changes a sheet setting having been created in advance. For this reason, it is important that the image forming apparatus 100 have a configuration that allows the user to change a sheet setting.

To change a sheet setting, the user selects the sheet for which setting is desired to be changed in the sheet-type selection screen of FIG. 8, and presses down a copy button. As a result, information about a new type of sheet in which a setting of the selected sheet is copied is created. FIG. 9 is a view for illustrating an example of a sheet-type selection screen in a case in which a new type of sheet is added. In FIG. 9, "THICK PAPER 1_REVISED" in which the "THICK PAPER 1" is copied is added. A sheet setting for the newly-added type of sheet is performed.

FIG. 10 is a view for illustrating an example of a sheet-setting change screen. The sheet setting of the newly-added type of sheet is performed in this change screen. The sheet-setting change screen is displayed on the display 301 when the sheet to be changed is selected by using the operation unit 300 in the selection screen of FIG. 9. A sheet setting includes "BASIS WEIGHT," "TRANSFER VOLTAGE," "FIXING TEMPERATURE," and "IMAGE FORMING SPEED IN IMAGE-QUALITY PRIORITY MODE," for example, but another setting regarding sheet may be changeable.

Figure 11:
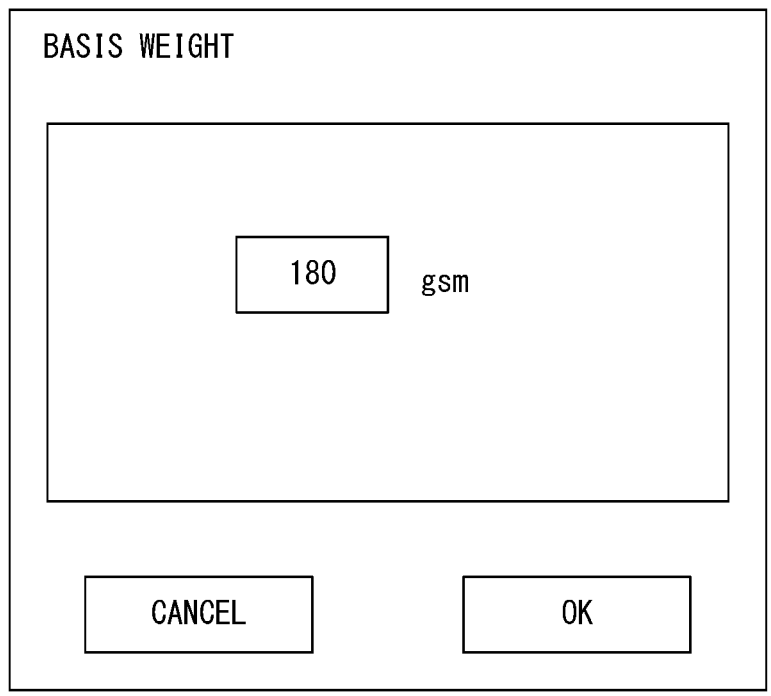
FIG. 11 is a view for illustrating an example of a basis-weight setting screen.

The "BASIS WEIGHT" is a button for changing a setting of a basis weight of the sheet. When the "BASIS WEIGHT" button is pressed down, a basis-weight setting screen exemplified in FIG. 11 is displayed on the display 301. The user can input a basis weight of the sheet in the unit of gsm by using the numeric keypad 306. The user presses down the OK button after inputting the basis weight, to thereby set the basis weight of the sheet.

The "TRANSFER VOLTAGE" is a button for changing a setting of a voltage value during transfer of an image (toner image) to the sheet in the secondary transfer unit 8. A sheet has different resistance values depending on the type (brand), and hence a transfer voltage is required to be adjusted for each brand. When the "TRANSFER VOLTAGE" button is pressed down, a transfer-voltage setting screen (not shown) is displayed on the display 301. The user can change a transfer voltage in accordance with the property of a sheet. A transfer voltage is one of parameters included in the image forming condition.

The "FIXING TEMPERATURE" is a button for changing a temperature (fixing temperature) of the fixing device 12 during fixing of a toner image on a sheet. A sheet has different thicknesses depending on the type (brand), and hence an amount of heat required for fixing of an image varies with each type of sheet. For this reason, a fixing temperature is adjustable. When the "FIXING TEMPERATURE" button is pressed down, a fixing-temperature setting screen (not shown) is displayed on the display 301. The user can change a fixing temperature in accordance with the property of a sheet. A fixing temperature is one of parameters included in the image forming condition.

Figure 12:
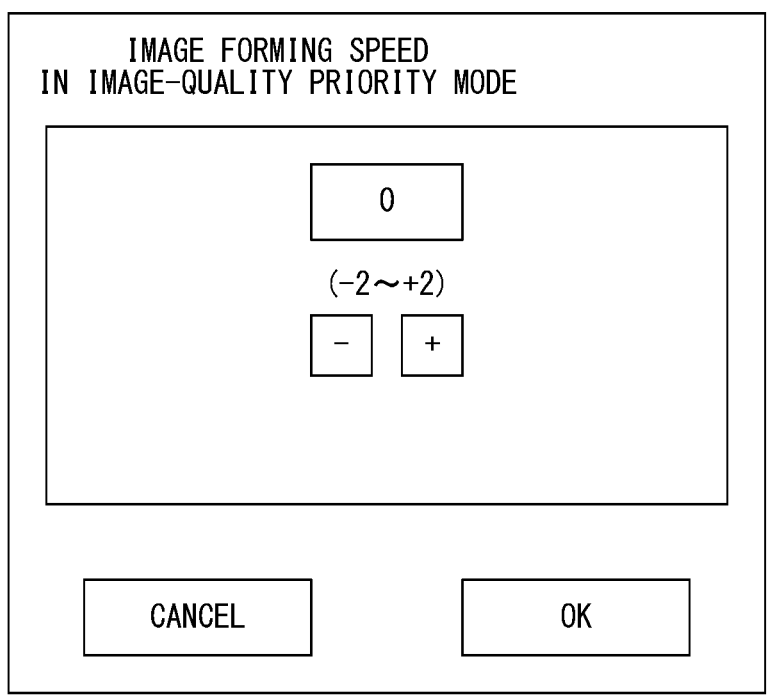
FIG. 12 is a view for illustrating an image-forming-speed setting screen in an image-quality priority mode.

The "IMAGE FORMING SPEED IN IMAGE-QUALITY PRIORITY MODE" is a button for changing the image forming speed in the image-quality priority mode. When the "IMAGE FORMING SPEED IN IMAGE-QUALITY PRIORITY MODE" button is pressed down, a setting screen of the image forming speed in the image-quality priority mode exemplified in FIG. 12 is displayed on the display 301. The user can change the image forming speed in the image-quality priority mode from a default speed having been set in advance by pressing down a "+" button or a "−" button by using the numeric keypad 306. When the "+" button is pressed down, the image forming speed in the image-quality priority mode is changed to a speed higher than the default speed. When the "−" button is pressed down, the image forming speed in the image-quality priority mode is changed to a speed lower than the default speed.

A result of change in the image forming speed in the image-quality priority mode made by press of the "+" button or the "−" button is displayed as a setting value (−2/−1/0/+1/+2) on the screen of FIG. 12. The result of change is user instruction information regarding a change in the image forming speed in the image-quality priority mode corresponding to the "THICK PAPER 1_REVISED." The user checks the displayed setting value and presses down the OK button, to thereby input the setting value to the CPU 204, and then the CPU 204 sets the image forming speed in the image-quality priority mode based on the result of change. The image forming speed in the productivity priority mode is not changed.

In a case in which the sheet S has a basis weight of 180 gsm, for example, the controller 200 sets the image forming speed in the image-quality priority mode to the default speed of 200 mm/s, based on FIG. 5. Thus, when "0" is displayed as a setting value on the screen of FIG. 12, the image forming speed in the image-quality priority mode is set to 200 mm/s. Further, when the "+" button is pressed down once in FIG. 12 (when a setting value is +1), the image forming speed in the image-quality priority mode is set to 300 mm/s higher by one level than the default speed, based on FIG. 4. When the "+" button is pressed down twice in FIG. 12 (when a setting value is +2), the image forming speed in the image-quality priority mode is set to 400 mm/s higher by two levels than the default speed, based on FIG. 4.

As described above, each item is changed in the sheet-setting change screen of FIG. 10. The user presses down the OK button after changing each item. When the OK button is pressed down, the controller 200 stores the setting of each item having been input into the RAM 203 as a sheet setting of a type of sheet obtained by copying. In this manner, a type of sheet obtained by copying is added to the list of a sheet.

<Image-Forming-Speed Determining Processing>

Figure 13:
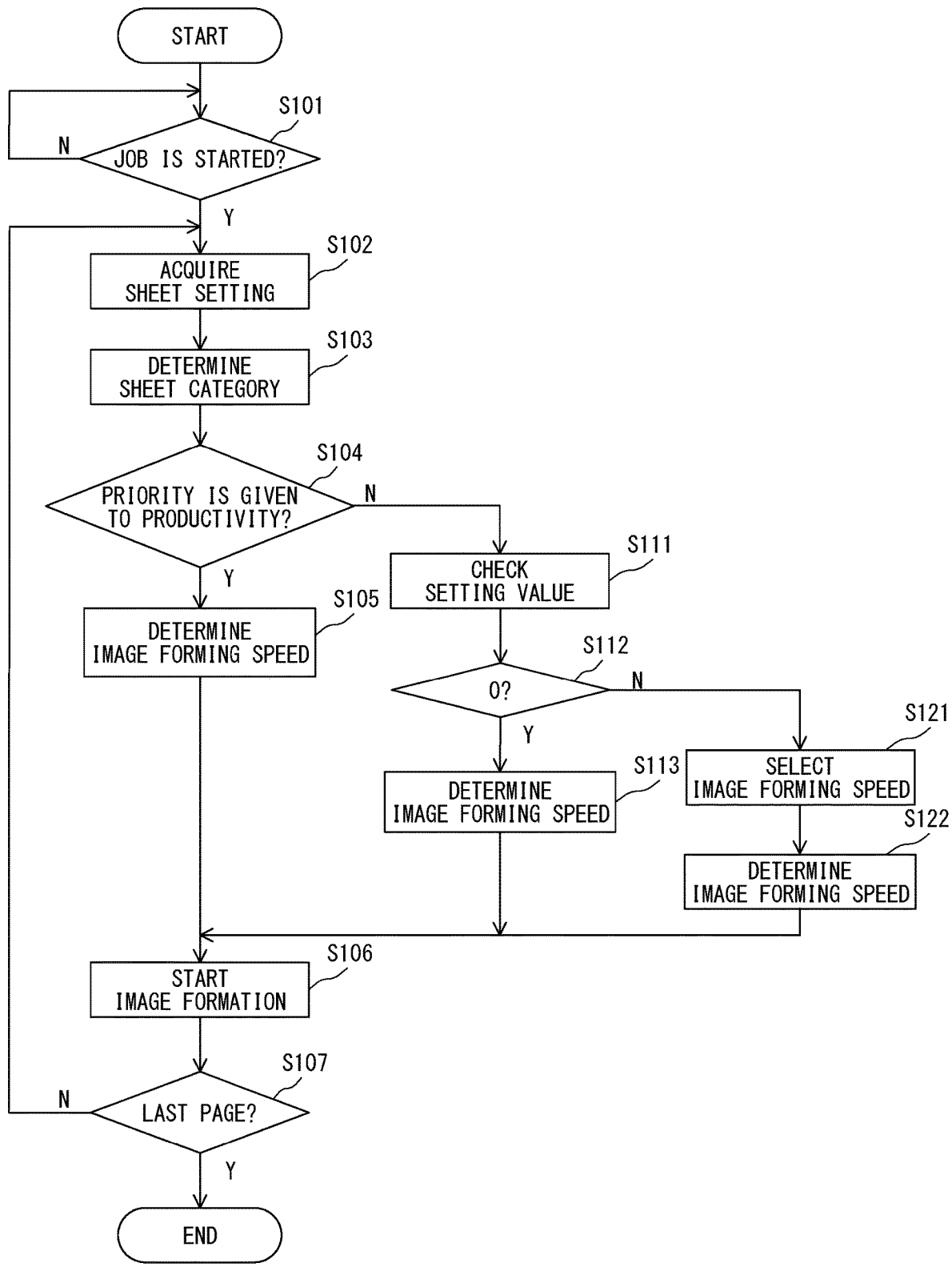
FIG. 13 is a flowchart for illustrating image forming processing.

FIG. 13 is a flowchart for illustrating image forming processing including processing of determining an image forming speed. In this processing, the image forming speed in the productivity priority mode and the image forming speed in the image-quality priority mode are determined. An image is formed at the image forming speed as determined.

A user presses down the start key 303 of the operation unit 300, to thereby give an instruction to start a job to the controller 200 (CPU 204). To this end, the controller 200 waits for a start of a job until the start key 303 is pressed down (Step S101: N). When the start key 303 of the operation unit 300 is pressed down by the user, the controller 200 starts a job (Step S101: Y). The controller 200 acquires a sheet setting provided for a sheet feed stage in which the sheet S used for an image forming operation is stored (Step S102). The controller 200 checks the "BASIS WEIGHT" of the sheet S based on the sheet setting, and determines the sheet category shown in FIG. 5 in accordance with the basis weight (Step S103).

The controller 200 determines whether an operation mode is the productivity priority mode by referring to the operation mode stored in the RAM 203 (Step S104). When the operation mode is the productivity priority mode (Step S104: Y), the controller 200 determines the image forming speed in the productivity priority mode from the table shown in FIG. 5 based on the sheet category determined in the processing step of Step S103 (Step S105).

When the operation mode is the image-quality priority mode (Step S104: N), the controller 200 checks a setting value of "IMAGE FORMING SPEED IN IMAGE-QUALITY PRIORITY MODE" included in the sheet setting acquired in the processing step of Step S102 (Step S111). The controller 200 determines whether the acquired setting value is "0" (Step S112). When the setting value is "0" (Step S112: Y), the controller 200 determines the image forming speed in the image-quality priority mode from the table shown in FIG. 5 based on the sheet category determined in the processing step of Step S103 (Step S113).

When the setting value is not "0" (Step S112: N), the controller 200 selects the default image forming speed in the same manner as in the processing step of Step S113 (Step S121). The controller 200 gives an offset to the selected image forming speed in accordance with the setting value, to thereby determine the image forming speed in the image-quality priority mode (Step S122).

After determining the image forming speed by the processing steps of Step S105, Step S113 or Step S122, the controller 200 starts an image forming operation by using the transfer voltage and the fixing temperature based on the sheet setting acquired in the processing step of Step S102, and the determined image forming speed (Step S106). Then, the image forming apparatus 100 forms an image on the sheet S, to thereby produce a printed product.

The controller 200 repeatedly performs the processing steps of Step S102 to Step S106, Step S111 to Step S113, Step S121, and Step S122 on each of pages instructed by the job up to the last page (Step S107: N). After performing the processing steps of Step S102 to Step S106, Step S111 to Step S113, Step S121, and Step S122 on each of the pages instructed by the job up to the last page, and outputting a printed product of the last page, the controller 200 ends the processing (Step S107).

In the above-mentioned processing, the operation mode is determined for each page, but the operation mode may be stored in the RAM 203 at the start of the job, and the processing may be performed with reference to the stored contents.

The image forming apparatus 100 according to the first embodiment can operate in both of the productivity priority mode and the image-quality priority mode, and determines an image forming speed based on the type of sheet and the operation mode. The image forming speed in the image-quality priority mode can be changed (adjusted). This allows an image forming operation to be performed at an image forming speed suitable to sheet even in the image-quality priority mode, which enables an image forming operation with improved productivity while maintaining an image quality. Thus, the image forming apparatus 100 according to the first embodiment can perform an image forming operation with improved productivity while maintaining an image quality in forming an image with a priority given to an image quality.

Second Embodiment

The image forming apparatus 100 and the controller 200 in a second embodiment of the present disclosure have configurations similar to those of the image forming apparatus 100 and the controller 200 in the first embodiment, and hence description thereof is omitted. The following description discusses differences from the image forming apparatus 100 according to the first embodiment.

In the first embodiment, the image forming speed in the image-quality priority mode can be changed by a user. This enables achievement of an image forming speed intended by the user, but an image forming speed that cannot guarantee an image quality may be set depending on a setting value. Thus, in the second embodiment, the following operation is performed.

Figure 14:
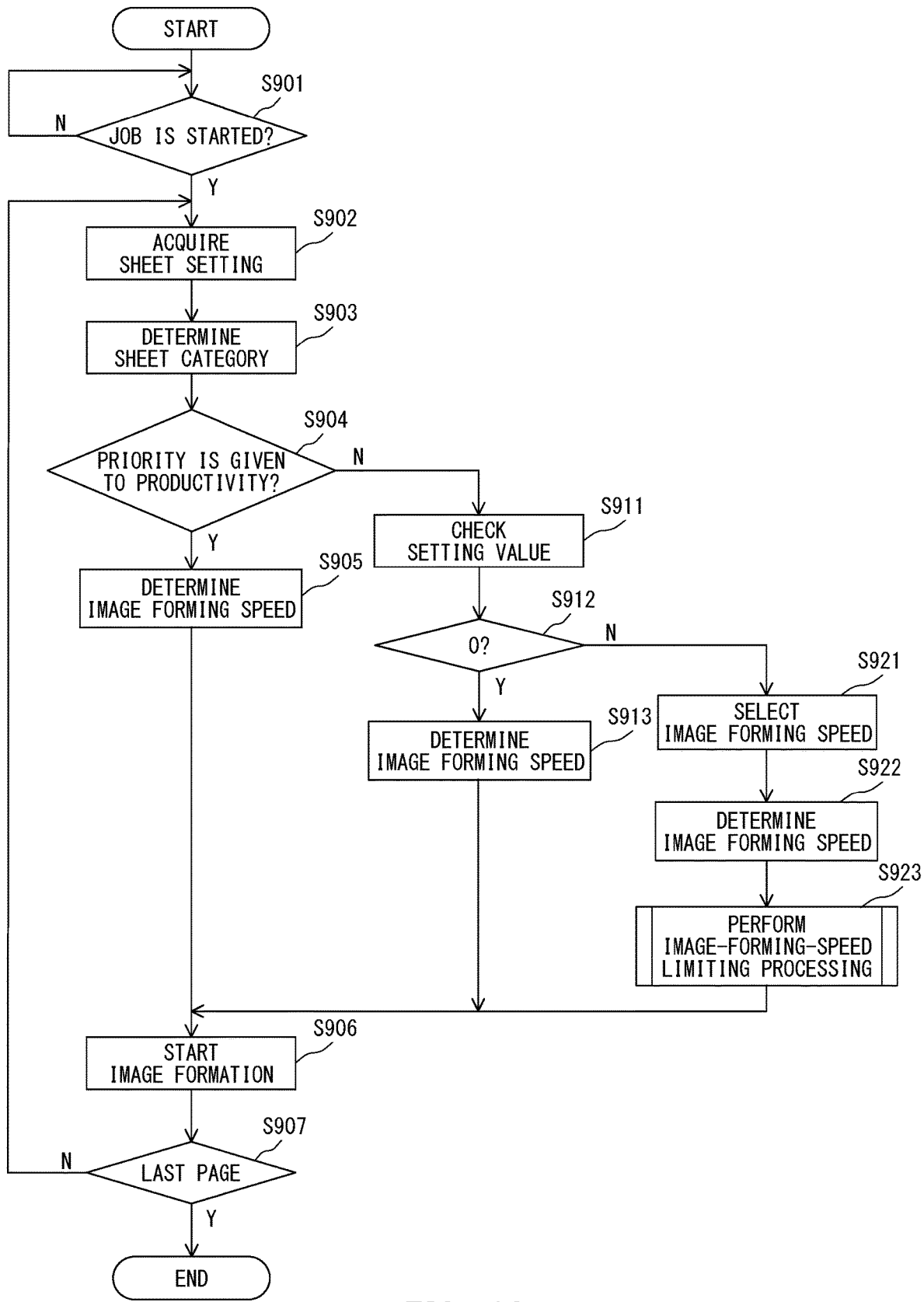
FIG. 14 is a flowchart for illustrating image forming processing.

FIG. 14 is a flowchart for illustrating image forming processing including processing of determining an image forming speed in the second embodiment. The controller 200 (CPU 204) determines an image forming speed by performing processing steps similar to the processing steps of Step S101 to Step S105, Step S111 to Step S113, Step S121, and Step S122 of FIG. 13 (Step S901 to Step S905, Step S911 to Step S913, Step S921, and Step S922).

In a case in which the operation mode is the image-quality priority mode and an offset is given to an image forming speed based on a setting value (Step S922), the controller 200 performs image-forming-speed limiting processing described later, to thereby keep the image forming speed to which an offset is given within a predetermined limit range (Step S923).

After determining the image forming speed, the controller 200 starts an image forming operation by using the transfer voltage and the fixing temperature based on the sheet setting acquired in the processing step of Step S902 and the determined image forming speed (Step S906). Then, the image forming apparatus 100 forms an image on the sheet S, to thereby produce a printed product.

The controller 200 repeatedly performs the processing steps of Step S902 to Step S906, Step S911 to Step S913, and Step S921 to Step S923 on each of pages instructed by a job up to the last page (Step S907: N). After performing the processing steps of Step S902 to Step S906, Step S911 to Step S913, and Step S921 to Step S923 on each of the pages instructed by the job up to the last page, and outputting a printed product of the last page, the controller 200 ends the processing (Step S907).

In the above-mentioned processing, the operation mode is determined for each page, but the operation mode may be stored in the RAM 203 at the start of the job, and the processing may be performed with reference to the stored contents.

Figure 15:
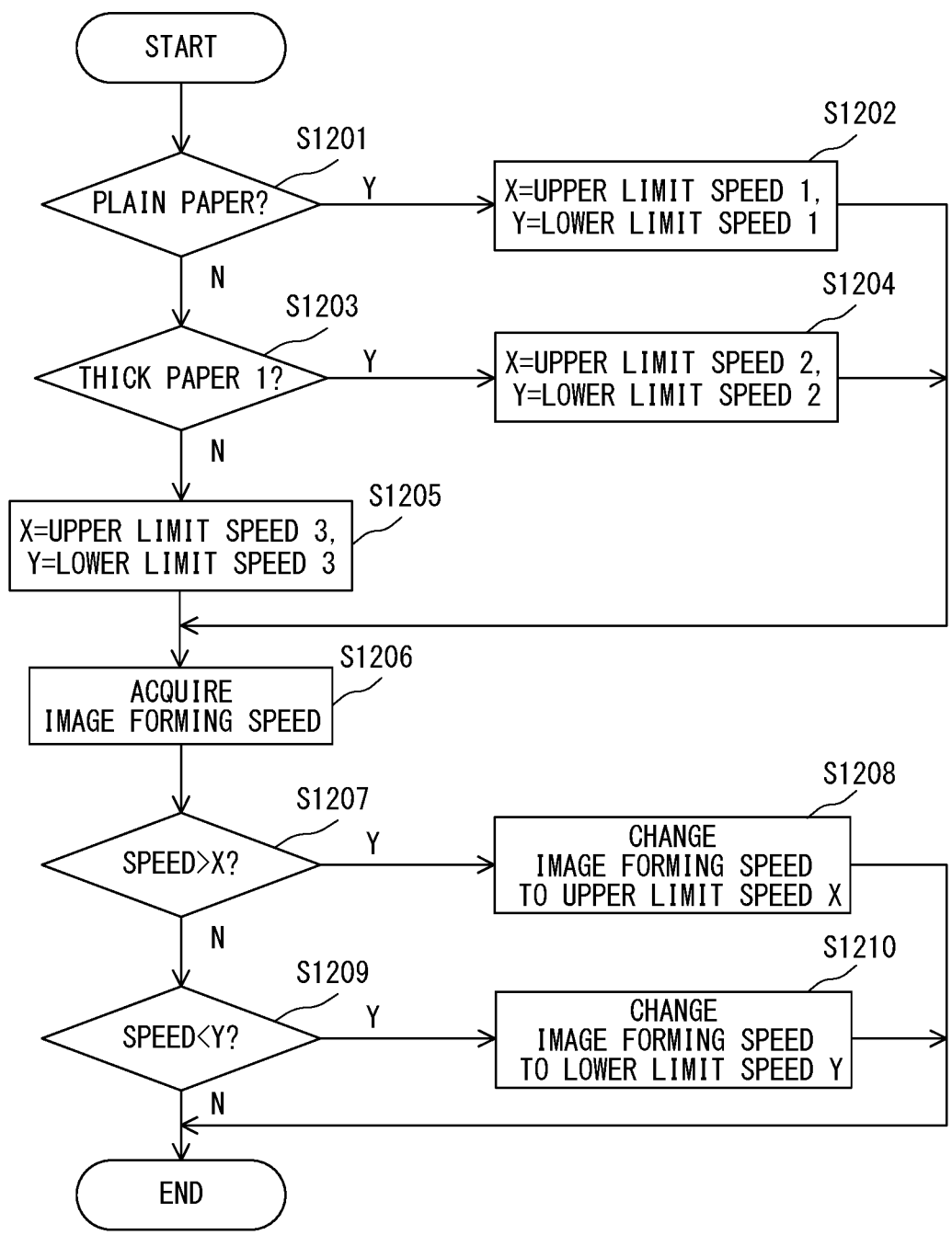
FIG. 15 is a flowchart for illustrating image-forming-speed limiting processing.
Figures 16, 17:
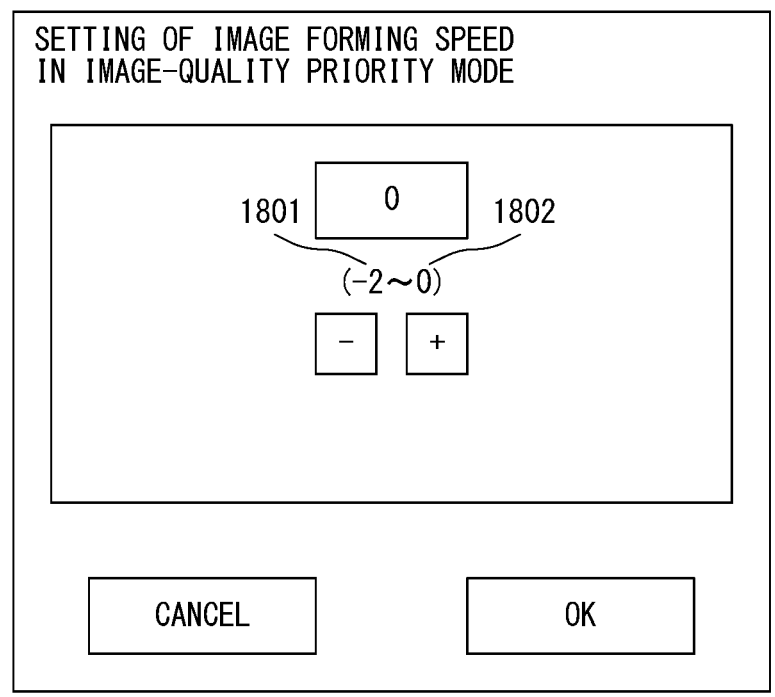
FIG. 16 is a diagram for showing an example of a table indicating a limit range of an image forming speed.
FIG. 17 is a view for illustrating an example of a setting screen for setting an upper limit value and a lower limit value.

FIG. 15 is a flowchart for illustrating image-forming-speed limiting processing of Step S923. FIG. 16 is a diagram for showing an example of a table indicating a limit range of image forming speed corresponding to each basis weight (sheet category). The limit range of image forming speed is defined by an upper limit speed and a lower limit speed for each sheet category. The table of FIG. 16 is stored in the RAM 203.

The controller 200 starts the image-forming-speed limiting processing and checks the type of the sheet S used for image formation. The controller 200 determines whether the type of the sheet S is set to the plain paper (having a basis weight of from 64 gsm to 150 gsm) (Step S1201). When the plain paper is set (Step S1201: Y), the controller 200 sets an upper limit speed X of the image forming speed to an upper limit speed 1 (FIG. 16), and sets a lower limit speed Y to a lower limit speed 1 (FIG. 16) (Step S1202).

When the plain paper is not set (Step S1201: N), the controller 200 determines whether the type of the sheet S is set to the thick paper 1 (having a basis weight of from 151 gsm to 250 gsm) (Step S1203). When the thick paper 1 is set (Step S1203: Y), the controller 200 sets the upper limit speed X of the image forming speed to an upper limit speed 2 (FIG. 16) and sets the lower limit speed Y to a lower limit speed 2 (FIG. 16) (Step S1204).

When the thick paper 1 is not set (Step S1203: N), the controller 200 determines that the sheet S is the thick paper 2 (having a basis weight of from 251 gsm to 350 gsm). In this case, the controller 200 sets the upper limit speed X of the image forming speed to an upper limit speed 3 (FIG. 16) and sets the lower limit speed Y to a lower limit speed 3 (FIG. 16) (Step S1205).

The reasons for setting the upper limit speed and the lower limit speed of the image forming speed for each basis weight of sheet as shown in FIG. 16 are to allow the image forming apparatus 100 to form an image within a suitable range of an image forming speed. For example, in a case in which an image is formed at an image forming speed exceeding the upper limit speed 1 of the plain paper, the photosensitive drum Dr may fail to be uniformly charged, and the image quality may consequently be reduced. Further, in a case in which an image is formed at an image forming speed falling below the lower limit speed 1, more heat than required may be applied to the sheet S when the sheet S passes the fixing device 12, and the image quality may consequently be reduced. For those reasons, the table of FIG. 16 that includes the maximum image forming speed (upper limit speed) that can guarantee the image quality for each basis weight of sheet and the lowest image forming speed (lower limit speed) that can guarantee the image quality for each basis weight of sheet are stored in the RAM 203 in advance.

In the second embodiment, the upper limit speed is set to a speed not exceeding the image forming speed in the productivity priority mode. This is because normally, the image forming speed in the "productivity priority mode" is the maximum speed at which the image forming apparatus 100 can form an image while guaranteeing an image quality.

The controller 200 acquires the image forming speed determined in the processing step of Step S922 of FIG. 14 (Step S1206). The controller 200 determines whether the image forming speed exceeds the upper limit speed X set in any of the processing steps of Step S1202, Step S1204, and Step S1205 (Step S1207). To this end, the controller 200 compares the image forming speed with the upper limit speed X that is set so as to correspond to the type of the sheet S. When the image forming speed exceeds the upper limit speed X (Step S1207: Y), the controller 200 changes the image forming speed to the upper limit speed X (Step S1208). After changing the image forming speed, the controller 200 ends the image-forming-speed limiting processing.

When the image forming speed does not exceed the upper limit speed X (Step S1207: N), the controller 200 determines whether the image forming speed falls below the lower limit speed Y that is set in any of the processing steps of Step S1202, Step S1204, and Step S1205 (Step S1209). To this end, the controller 200 compares the image forming speed with the lower limit speed Y that is set so as to correspond to the type of the sheet S. When the image forming speed falls below the lower limit speed Y (Step S1209: Y), the controller 200 changes the image forming speed to the lower limit speed Y (Step S1210). After changing the image forming speed, the controller 200 ends the image-forming-speed limiting processing. When the image forming speed does not fall below the lower limit speed Y (Step S1209: N), the controller 200 ends the image-forming-speed limiting processing without changing the image forming speed.

For example, in a case in which the basis weight of the sheet S is set to 180 gsm in the screen of FIG. 11, the default image forming speed in the image-quality priority mode is set to 200 mm/s based on FIG. 5. Then, when the image forming speed is set to "−1" or "−2" in the screen of FIG. 12, the image forming speed is changed to 200 mm/s or lower. However, by the image-forming-speed limiting processing, the image forming speed after the change is again changed to 200 mm/s. This allows the image forming apparatus 100 to form an image on the sheet S at an image forming speed that guarantees the image quality.

Figure 18:
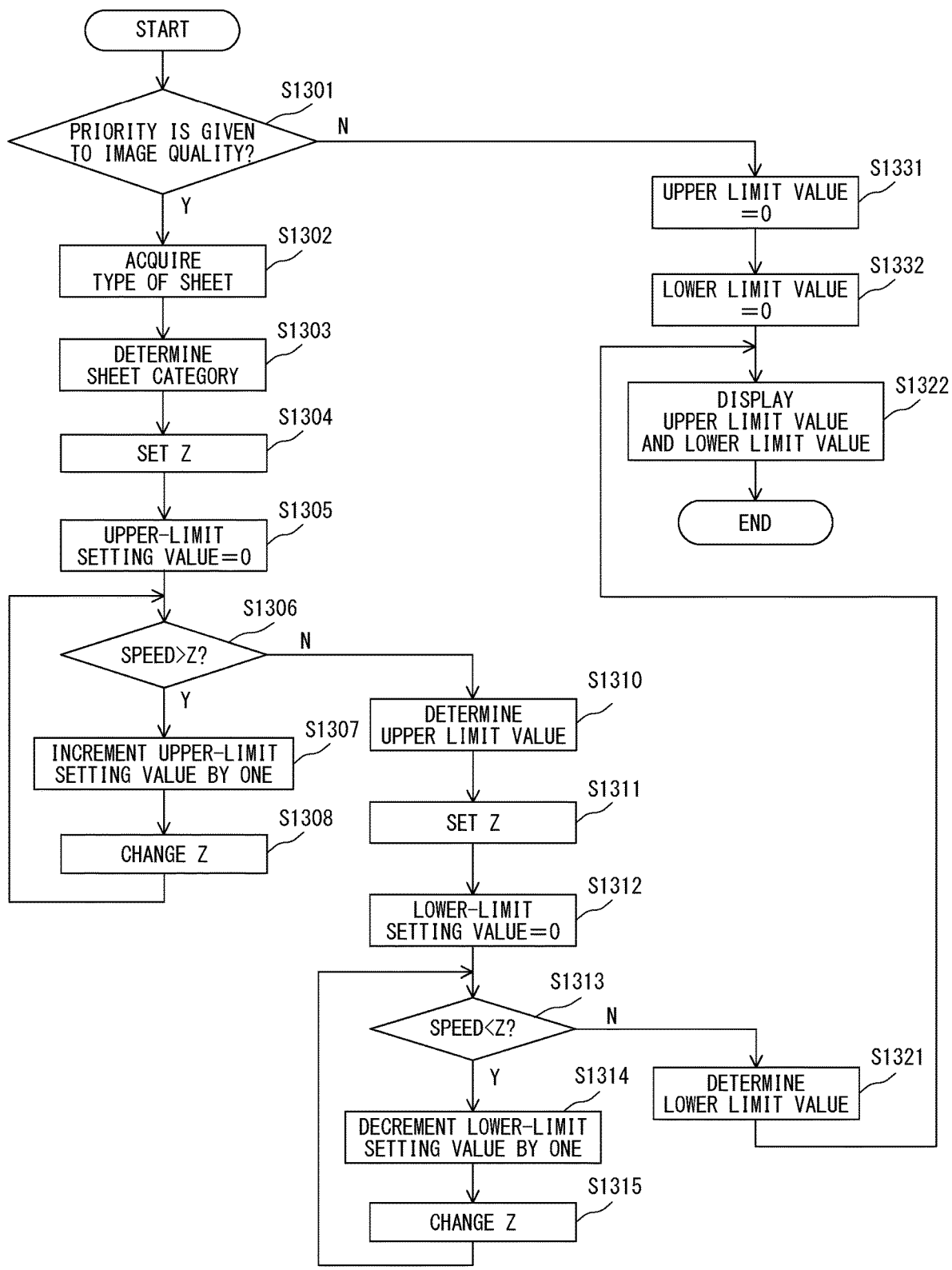
FIG. 18 is a flowchart for illustrating processing of determining the upper limit value and the lower limit value.

FIG. 17 is a view for illustrating an example of a setting screen for setting an upper limit value and a lower limit value of a changeable range of the image forming speed. This screen is displayed on the display 301. An upper limit value 1802 and a lower limit value 1801 vary depending on the basis weight of sheet. FIG. 18 is a flowchart for illustrating processing of determining the upper limit value 1802 and the lower limit value 1801. This processing is started when a user selects the "IMAGE FORMING SPEED IN IMAGE-QUALITY PRIORITY MODE" in the sheet-setting change screen of FIG. 10 and presses down the OK button.

The controller 200 determines whether the image-quality priority mode is set by referring to the operation mode stored in the RAM 203 (Step S1301). When the operation mode is the image-quality priority mode (Step S1301: Y), the controller 200 acquires the type of sheet selected in the selection screen of FIG. 8 (Step S1302). The controller 200 determines a sheet category from the table shown in FIG. 5 based on the basis weight of the type of sheet having been acquired (Step S1303).

The controller 200 determines the upper limit value 1802 after determining the sheet category, and subsequently determines the lower limit value 1801. The upper limit value 1802 and the lower limit value 1801 may be determined in an order reverse to the above-mentioned order. Here, description is given about a case in which the basis weight of sheet is set to 180 gsm in the basis-weight setting screen of FIG. 11, as an example.

The controller 200 selects the image forming speed in the image-quality priority mode from the table shown in FIG. 5 based on the determined sheet category. The controller 200 sets the selected image forming speed to a variable Z stored in the RAM 203 as a speed in the image-quality priority mode (Step S1304). For the basis weight of 180 gsm, the sheet category is the "thick paper 1" and the image forming speed (=the variable Z) in the image-quality priority mode is 200 mm/s. After setting the variable Z, the controller 200 clears an upper-limit setting value stored in the RAM 203 to "0" (Step S1305).

The controller 200 selects an image forming speed in the productivity priority mode from the table shown in FIG. 5 based on the determined sheet category. The controller 200 compares the selected image forming speed in the productivity priority mode with the image forming speed set to the variable Z (Step S1306). For the basis weight of 180 gsm, the image forming speed in the productivity priority mode is 400 mm/s. The image forming speed set to the variable Z is 200 mm/s.

When the image forming speed in the productivity priority mode is higher than the image forming speed set to the variable Z (Step S1306: Y), the controller 200 increments the upper-limit setting value by one (Step S1307). The controller 200 changes the image forming speed set to the variable Z to a speed higher by one level in accordance with any of the speeds settable in the image forming apparatus 100 shown in FIG. 4 (Step S1308). For the basis weight of 180 gsm, the variable Z for the image forming speed is changed from 200 mm/s to 300 mm/s, which is higher by one level.

The controller 200 repeatedly performs the processing steps of Step S1306 to Step S1308 for a duration in which the image forming speed in the productivity priority mode is higher than the image forming speed set to the variable Z. When the image forming speed in the productivity priority mode becomes equal to or lower than the image forming speed set to the variable Z (Step S1306: N), the controller 200 determines that the upper-limit setting value that has been updated by repetition of the processing steps of Step S1306 to Step S1308 is the upper limit value 1802 (Step S1310).

For the basis weight of 180 gsm, the speed in the productivity priority mode is 400 mm/s, and the image forming speed set to the variable Z is 200 mm/s. When the upper-limit setting value is incremented by one and the variable Z for the image forming speed is changed to a speed higher by one level, the image forming speed set to the variable Z is changed to 300 mm/s. To repeat again the processing steps of Step S1306 to Step S1308 makes the image forming speed in the productivity priority mode equal to the image forming speed set to the variable Z, specifically, 400 mm/s. The upper-limit setting value is "+2". At that time, the process proceeds to Step S1310, and it is determined that the upper-limit setting value of "+2" is the upper limit value 1802.

After determining the upper limit value 1802, the controller 200 sets the image forming speed in the image-quality priority mode to the variable Z in the same manner as in the processing step of Step S1304 (Step S1311). After setting the variable Z, the controller 200 clears a lower-limit setting value stored in the RAM 203 to "0" (Step S1311). The controller 200 selects the lowest image forming speed (200 mm/s) from the speeds settable in the image forming apparatus 100 shown in FIG. 4. The controller 200 compares the selected lowest image forming speed with the image forming speed set to the variable Z (Step S1313).

When the lowest image forming speed is equal to or higher than the image forming speed set to the variable Z (Step S1313: Y), the controller 200 determines that the lower-limit setting value is the lower limit value 1801 (Step S1321). For the basis weight of 180 gsm, the lowest speed is 200 mm/s, and the variable Z for the image forming speed is 200 mm/s. Thus, it is determined that the lower-limit setting value of "0" is the lower limit value 1801.

When the lowest image forming speed is lower than the image forming speed set to the variable Z (Step S1313: N), the controller 200 decrements the lower-limit setting value by one (Step S1314). The controller 200 changes the image forming speed set to the variable Z to a speed lower by one level in accordance with any of the speeds settable in the image forming apparatus 100 shown in FIG. 4 (Step S1315). The controller 200 repeatedly performs the processing steps of Step S1313 to Step S1315 for a duration in which the lowest image forming speed is lower than the image forming speed set to the variable Z.

When the lowest image forming speed becomes equal to or higher than the image forming speed set to the variable Z (Step S1313: N), the controller 200 determines that the lower-limit setting value that has been updated by repetition of the processing steps of Step S1313 to Step S1315 is the lower limit value 1801 (Step S1321). For the basis weight of 180 gsm, the lowest speed is 200 mm/s, and the image forming speed set to the variable Z is 200 mm/s. Thus, in this case, the processing steps of Step S1313 to Step S1315 are not performed.

After determining the upper limit value 1802 and the lower limit value 1801, the controller 200 displays the determined upper limit value 1802 and the determined lower limit value 1801 on the display 301 (Step S1322). For the basis weight of 180 gsm, as exemplified in FIG. 17, "+2" is displayed as the upper limit value 1802, and "0" is displayed as the lower limit value 1801.

In a case in which the operation mode is the productivity priority mode (Step S1301: N), the controller 200 determines that each of the upper limit value 1802 and the lower limit value 1801 is "0" (Step S1331 and Step S1332). The determined upper limit value 1802 and the determined lower limit value 1801 are displayed on the display 301 (Step S1322). Although "0" is displayed as the upper limit value 1802 and the lower limit value 1801 in the productivity priority mode, any displaying way that indicates that press of the "+" button and the "−" button of FIG. 18 in the productivity priority mode takes no effect can be used.

To set the upper limit value 1802 and the lower limit value 1801 as described above can prevent an image forming speed that cannot guarantee an image quality from being set when a user changes an image forming speed. Thus, the image forming apparatus according to the second embodiment can perform an image forming operation with improved productivity while maintaining an image quality in forming an image with priority given to an image quality.

Third Embodiment

The image forming apparatus 100 and the controller 200 in a third embodiment of the present disclosure have configurations similar to those of the image forming apparatus 100 and the controller 200 in the first embodiment, and hence description thereof is omitted. The following description discusses differences from the image forming apparatus 100 according to the first and second embodiments.

In the first embodiment, the "IMAGE FORMING SPEED IN IMAGE-QUALITY PRIORITY MODE" is displayed as the changeable item in the sheet-setting change screen of FIG. 10 irrespective of which of the image-quality priority mode and the productivity priority mode the operation mode is set to. However, in the productivity priority mode, the "IMAGE FORMING SPEED IN IMAGE-QUALITY PRIORITY MODE" is not used in forming an image. Thus, in the productivity priority mode, even when a user sets an image forming speed in the image-quality priority mode, a result not expected by the user may be produced. This reduces the usability.

Figure 19:
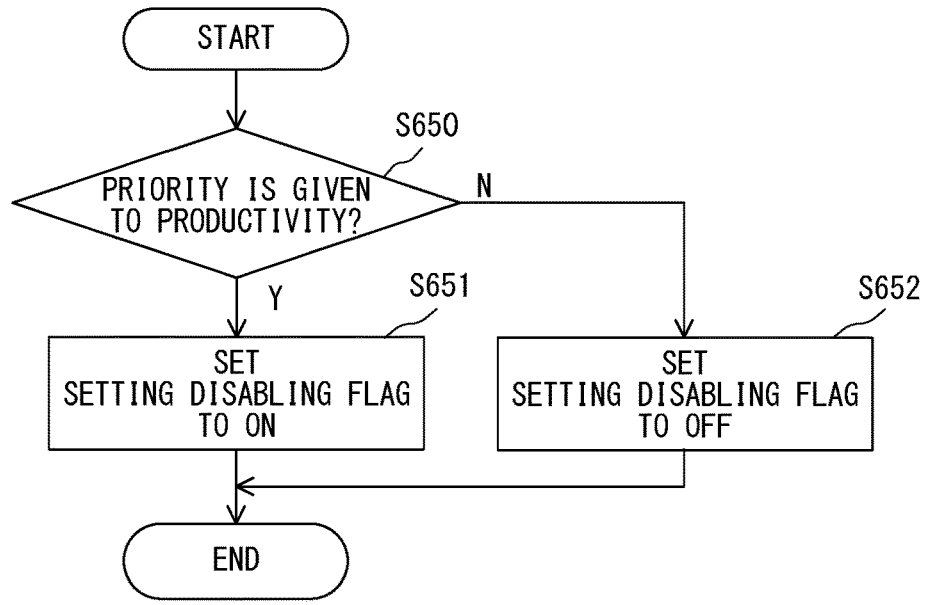
FIG. 19 is a flowchart for illustrating display setting processing for the sheet-setting change screen.

In the third embodiment, in the productivity priority mode, the "IMAGE FORMING SPEED IN IMAGE-QUALITY PRIORITY MODE" is not included as the changeable item in the sheet-setting change screen. FIG. 19 is a flowchart for illustrating display setting processing for the sheet-setting change screen.

The controller 200 determines whether the productivity priority mode is selected by the user mode key 308 in the operation-mode selection screen of FIG. 6 (Step S650). When the productivity priority mode is selected (Step S650: Y), the controller 200 sets a state of a setting disabling flag of the image forming speed in the image-quality priority mode stored in the RAM 203 to ON (Step S651). When the image-quality priority mode is selected (Step S650: N), the controller 200 sets a state of the setting disabling flag of the image forming speed in the image-quality priority mode to OFF (Step S652). The state of the setting disabling flag of the image forming speed in the image-quality priority mode is stored in the RAM 203.

Figure 20:
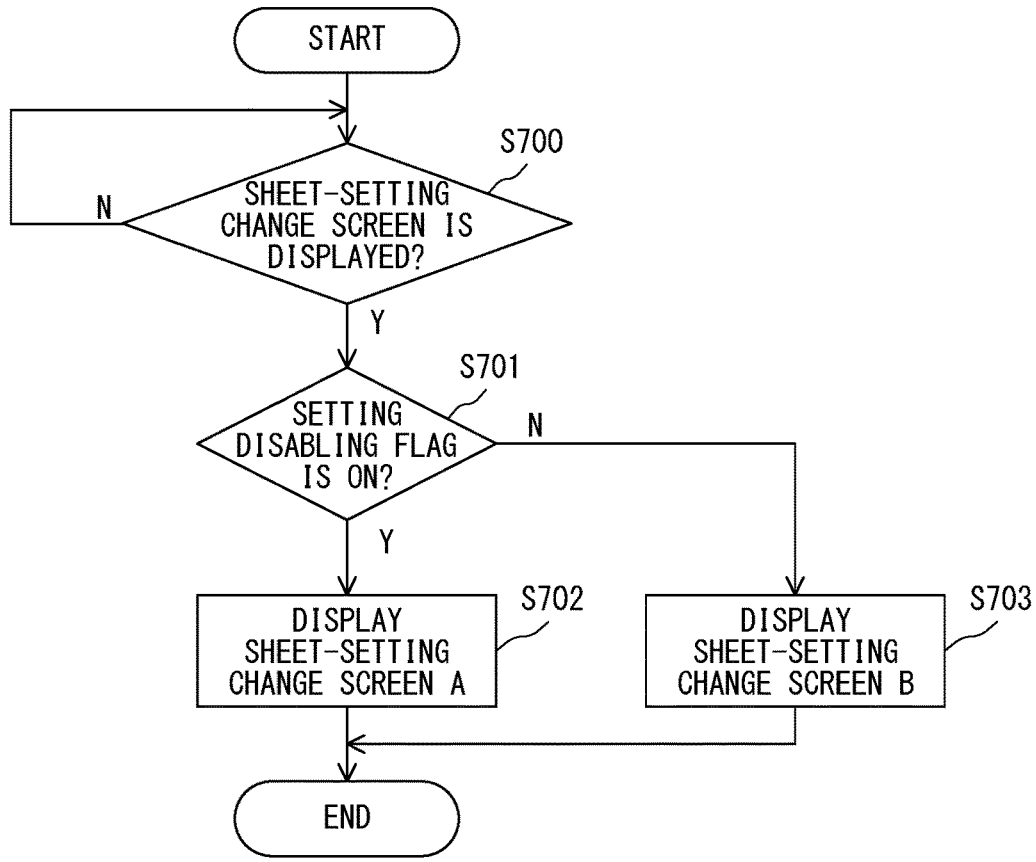
FIG. 20 is a flowchart for illustrating displaying processing for the sheet-setting change screen.

FIG. 20 is a flowchart for illustrating displaying processing for the sheet-setting change screen.

The controller 200 waits until a sheet for which setting is to be changed is selected by using the operation unit 300 through the selection screen of FIG. 9 and an instruction to display the sheet-setting change screen is given (Step S700: N). When an instruction to display the sheet-setting change screen is given (Step S700: Y), the controller 200 checks the state of the setting disabling flag of the image forming speed in the image-quality priority mode stored in the RAM 203 (Step S701).

Figure 21:
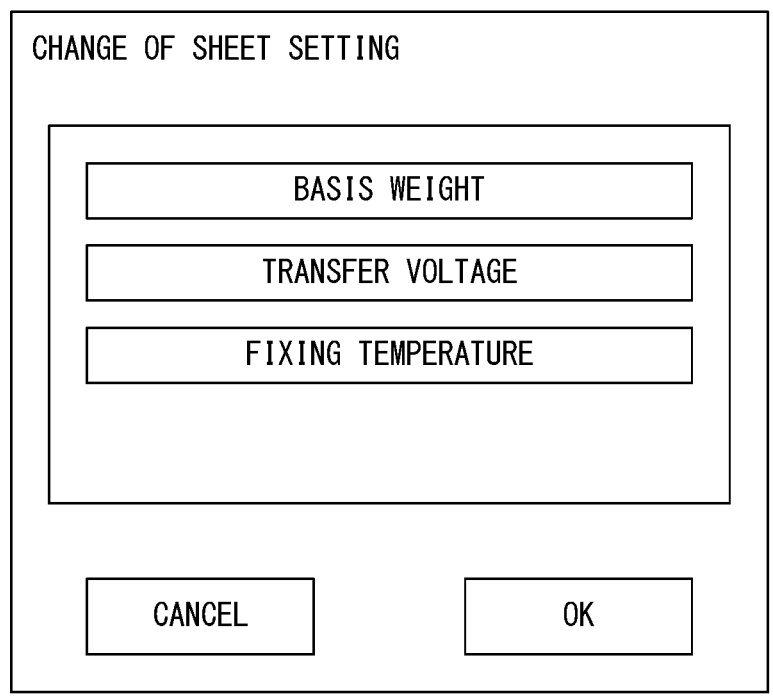
FIG. 21 is a view for illustrating an example of a sheet-setting change screen A.

When the state of the setting disabling flag is ON (Step S701: Y), the controller 200 displays a sheet-setting change screen A on the display 301 (Step S702). FIG. 21 is a view for illustrating an example of the sheet-setting change screen A. The sheet-setting change screen A is the sheet-setting change screen of FIG. 10 from which the item of "IMAGE FORMING SPEED IN IMAGE-QUALITY PRIORITY MODE" is removed. When the state of the setting disabling flag is OFF (Step S701: N), the controller 200 displays a sheet-setting change screen B on the display 301 (Step S703). The sheet-setting change screen B is the sheet-setting change screen of FIG. 10.

With the processing described above, in the productivity priority mode, the item of "IMAGE FORMING SPEED IN IMAGE-QUALITY PRIORITY MODE" is not displayed in the sheet-setting change screen, and an input of a setting value for changing the image forming speed is disabled. This can prevent reduction of the usability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-008457, filed Jan. 24, 2022, which is hereby incorporated by reference herein in its entirety.

What is claimed is:

1. An operation device used to input user instruction information to an image forming apparatus which is configured to form an image on a sheet based on a mode selected from a plurality of modes having different image forming speeds, comprising:
a display configured to display a selection screen for selecting a type of sheet from among multiple types of sheets, and display a change screen for changing a first image forming speed corresponding to the type of the sheet, the first image forming speed being for a first mode included in the plurality of modes,
a controller configured to control the display, after the type of sheet has been selected on the selection screen, to display a button for displaying the change screen.

2. The operation device according to claim 1, wherein the controller further controls the display to display a mode selection screen for selecting an operation mode of the image forming apparatus from the plurality of modes.

3. The operation device according to claim 2, wherein in a case where a first mode included in the plurality of modes is selected in the mode selection screen, the controller controls the display to display the button on the display after the type of sheet has been selected on the selection screen.

4. The operation device according to claim 3, wherein the change screen is not displayed on the display in a case where a second mode included in the plurality of modes is selected in the mode selection screen.

5. The operation device according to claim 1, wherein the change screen includes a button for increasing the first image forming speed and a button for decreasing the first image forming speed.

6. The operation device according to claim 1, the change screen includes information regarding a changeable range of the first image forming speed.

7. The operation device according to claim 1, wherein the image forming apparatus includes:
a photosensitive member;
a light source configured to expose the photosensitive member to light to form an electrostatic latent image on the photosensitive member;
a developing unit configured to develop the electrostatic latent image on the photosensitive member;
an intermediate transfer member onto which an image on the photosensitive member is to be transferred; and
a transfer unit configured to transfer the image from the intermediate transfer member onto the sheet at a transfer nip formed between the transfer unit and the intermediate transfer member, and
wherein a rotation speed of the photosensitive member is controlled based on the image forming speed.

8. The operation device according to claim 1, wherein the image forming apparatus includes:
a photosensitive member;
a light source configured to expose the photosensitive member to light to form an electrostatic latent image on the photosensitive member;
a developing unit configured to develop the electrostatic latent image on the photosensitive member;
an intermediate transfer member onto which an image on the photosensitive member is to be transferred; and
a transfer unit configured to transfer the image from the intermediate transfer member onto the sheet at a transfer nip formed between the transfer unit and the intermediate transfer member, and
wherein a conveying speed at which the sheet passes the transfer nip is controlled based on the image forming speed.

9. The operation device according to claim 1, wherein the image forming apparatus includes:
a photosensitive member;
a light source configured to expose the photosensitive member to light to form an electrostatic latent image on the photosensitive member;
a developing unit configured to develop the electrostatic latent image on the photosensitive member;
an intermediate transfer member onto which an image on the photosensitive member is to be transferred;
a transfer unit configured to transfer the image from the intermediate transfer member onto the sheet at a transfer nip formed between the transfer unit and the intermediate transfer member; and
a fixing unit configured to fix the image on the sheet while conveying the sheet, and
wherein a sheet conveying speed at which the sheet is conveyed by the fixing unit is controlled based on the image forming speed.

10. The operation device according to claim 1,
wherein the first image forming speed corresponding to a first type of sheet for the first mode is higher than a second image forming speed corresponding to the first type of sheet for a second mode, and
wherein the first image forming speed corresponding to the first type of sheet in the first mode is different from the first image forming speed corresponding to a second type of sheet different from the first type in the first mode.

11. The operation device according to claim 10,
wherein a basis weight of the first type of sheet is lighter than a basis weight of the second type of sheet.

12. The operation device according to claim 11,
wherein the first image forming speed corresponding to the first type of sheet is higher than the second image forming speed corresponding to the first type of sheet, and
wherein the first image forming speed corresponding to the first type of sheet is higher than the first image forming speed corresponding to a second type of sheet different from the first type of sheet.

13. The operation device according to claim 12,
wherein the first image forming speed corresponding to a third type of sheet different from both the first type of sheet and the second type of sheet is equal to the second image forming speed corresponding to the third type of sheet, and
wherein the second image forming speed corresponding to the third type of sheet is higher than the second image forming speed corresponding to the first type of sheet.

14. The operation device according to claim 11,
wherein, in the first mode, the image forming apparatus has higher production capability than production capability in the second mode.

15. The operation device according to claim 10,
wherein the first image forming speed corresponding to a third type of sheet different from both the first type of sheet and the second type of sheet in the first mode is equal to the second image forming speed corresponding to the third type of sheet, and
wherein the second image forming speed corresponding to the third type of sheet is higher than the second image forming speed corresponding to the first type of sheet.

16. The operation device according to claim 15,
wherein a basis weight of the third type of sheet is lighter than a basis weight of the first type of sheet.

\* \* \* \* \*